(12) United States Patent
Sahashi

(10) Patent No.: US 9,483,173 B2
(45) Date of Patent: Nov. 1, 2016

(54) INFORMATION PROCESSOR INPUT BUTTON DISPLAY THAT PREVENTS SELECTION OF UNDESIRED BUTTON

(71) Applicant: KABUSHIKI KAISHA TOKAI RIKA DENKI SEISAKUSHO, Aichi (JP)

(72) Inventor: Yuichi Sahashi, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 0 days.

(21) Appl. No.: 14/538,284

(22) Filed: Nov. 11, 2014

(65) Prior Publication Data

US 2015/0130718 A1    May 14, 2015

(30) Foreign Application Priority Data

Nov. 12, 2013  (JP) .................................. 2013-233769

(51) Int. Cl.
*G06F 3/033*  (2013.01)
*G06F 3/0488*  (2013.01)
*G06F 3/0354*  (2013.01)
*G06F 3/0482*  (2013.01)

(52) U.S. Cl.
CPC ......... *G06F 3/0488* (2013.01); *G06F 3/03547* (2013.01); *G06F 3/0482* (2013.01)

(58) Field of Classification Search
CPC .. G06F 3/0418; G06F 3/0482; G06F 3/0488; G06F 3/03547

USPC ......................................................... 345/158
See application file for complete search history.

(56) References Cited

U.S. PATENT DOCUMENTS

2013/0097564 A1    4/2013  Morikawa et al.

FOREIGN PATENT DOCUMENTS

JP    09-190287    7/1997
JP    2013-088961    5/2013

OTHER PUBLICATIONS

Japanese Office Action dated Dec. 24, 2014 and partial English translation of notice of reasons for rejection.

*Primary Examiner* — Gustavo Polo
(74) *Attorney, Agent, or Firm* — Roberts Mlotkowski Safran Cole & Calderon, PC

(57) ABSTRACT

An information processor includes a means for displaying a plurality of item buttons in a display region, the item buttons each having center coordinates and outlines, a means for determining coordinates of an indicated position in the display area based on an input signal, a means for calibrating the center coordinates of each of the plurality of item buttons to coordinates between the center coordinates and the outlines of each of the item buttons to obtain the calibrated center coordinates, and a means for determining one of the item buttons to be in a selected state such that the calibrated center coordinates of the determined one is closest to the coordinates of the indicated position.

5 Claims, 4 Drawing Sheets

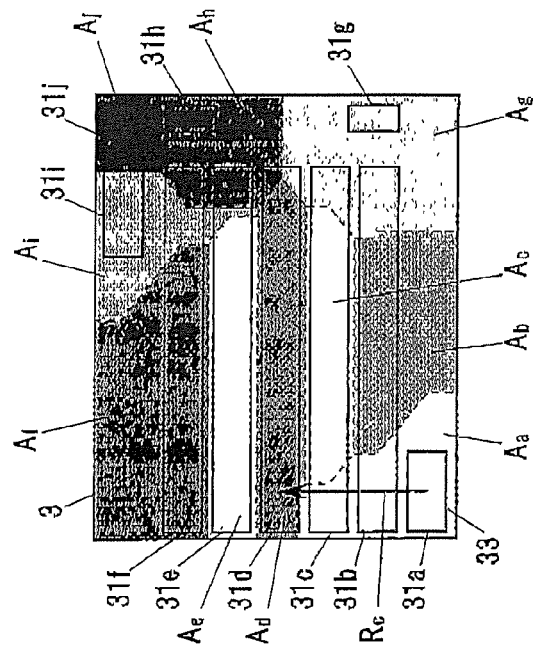
FIG.3B WITHOUT CALIBRATION
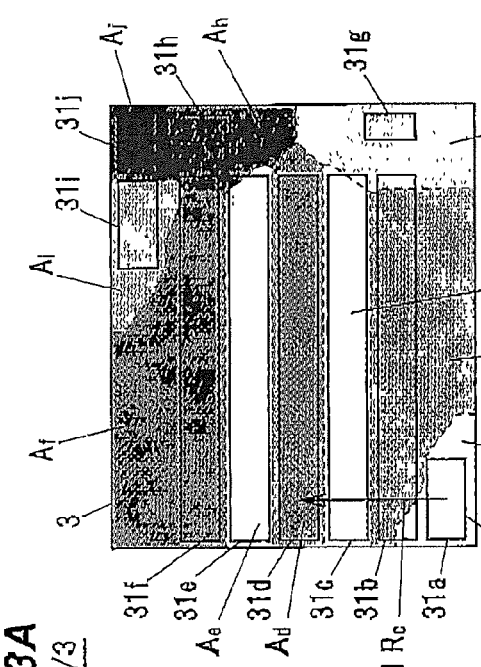
FIG.3A $\alpha = 1/3$
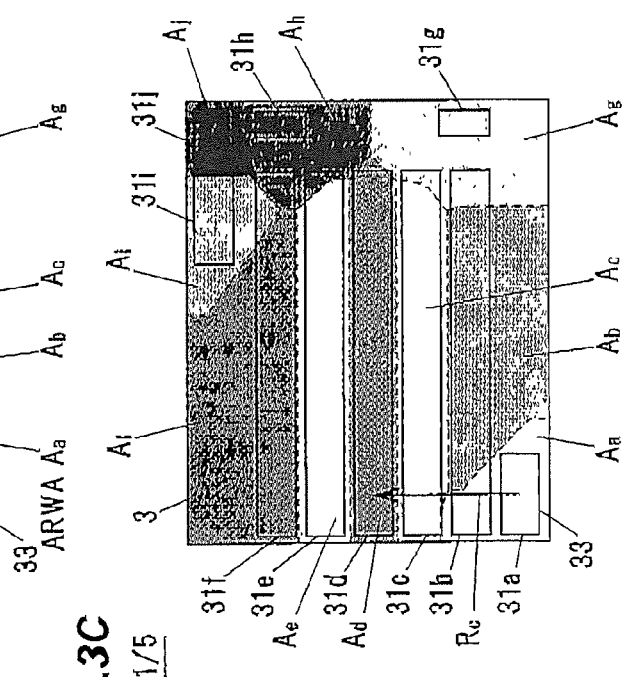
FIG.3C $\alpha = 1/5$

INFORMATION PROCESSOR INPUT BUTTON DISPLAY THAT PREVENTS SELECTION OF UNDESIRED BUTTON

The present application is based on Japanese patent application No. 2013-233769 filed on Nov. 12, 2013, the entire contents of which are incorporated herein by reference.

BACKGROUND OF THE INVENTION

1. Field of the Invention

The invention relates to an information processor.

2. Related Art

An information processor is known in which a cursor moves to a desired position even when the cursor is not precisely pointing on one of plural icons displayed on a display screen (see, e.g., JP-A-H09-190287).

The information processor includes a display for displaying plural icons on the display screen, a touch pad for outputting a coordinate signal corresponding to a position touched by a user, and a control unit for controlling a position of a cursor displayed on the display screen based on the coordinate signal output by the touch pad. When the cursor is not pointing on any of the plural icons, the control unit compares the position of the cursor to the coordinates of the center of each of the plural icons and moves the cursor onto the nearest icon.

SUMMARY OF THE INVENTION

The information processor disclosed in JP-A-H09-490287 operates such that the cursor moves to the nearest icon but a problem may arise that the cursor moved thereto selects an icon undesired by the user due to the sizes, shapes and positional relation of the plural icons displayed on the display screen.

It is an object of the invention to provide an information processor that prevents the selection of the undesired icon due to the sizes, shapes and positional relation of plural icons displayed on a display screen as compared to the conventional one.

(1) According to one embodiment of the invention, an information processor comprises:

a means for displaying a plurality of item buttons in a display region, the item buttons each having center coordinates and outlines;

a means for determining coordinates of an indicated position in the display area based on an input signal;

a means for calibrating the center coordinates of each of the plurality of item buttons to coordinates between the center coordinates and the outlines of each of the item buttons to obtain the calibrated center coordinates; and a means for determining one of the item buttons to be in a selected state such that the calibrated center coordinates of the determined one is closest to the coordinates of the indicated position.

In the above embodiment (1) of the invention, the following modifications and changes can be made.

(i) The calibrating means operates such that the center coordinates are displaced in a direction toward one of the outlines by a predetermined rate of a width of each of the item buttons to obtain the calibrated center coordinates.

(ii) The displaying means comprises a display for displaying a control screen of an in-vehicle device, and wherein the input signal is outputted from a touch pad electrically connected to the display.

(iii) The coordinates of the indicated position comprises coordinates to be indicated by a cursor displayed on the display, and wherein the cursor moves in the display region based on the input signal.

(iv) The coordinates of the indicated position and the center coordinates are defined by an origin disposed in the display region, and wherein the calibrating means calculates the calibrated center coordinates by subtracting or adding an X coordinate value and/or Y coordinate value corresponding the predetermined rate of the width from/to the center coordinates.

Advantageous Effects of the Invention

According to one embodiment of the invention, an information processor can be provided that prevents the selection of the undesired icon due to, the sizes, shapes and positional relation of plural icons displayed on a display screen as compared to the conventional one.

BRIEF DESCRIPTION OF THE DRAWINGS

Next, the present invention will be explained in more detail in conjunction with appended drawings, wherein:

FIGS. 3A to 3C are schematic views showing the item button selected based on the positional relation between the pointing cursor and the item buttons.

DESCRIPTION OF THE PREFERRED EMBODIMENT

Embodiment

Configuration of Information Processor

Figure 1:
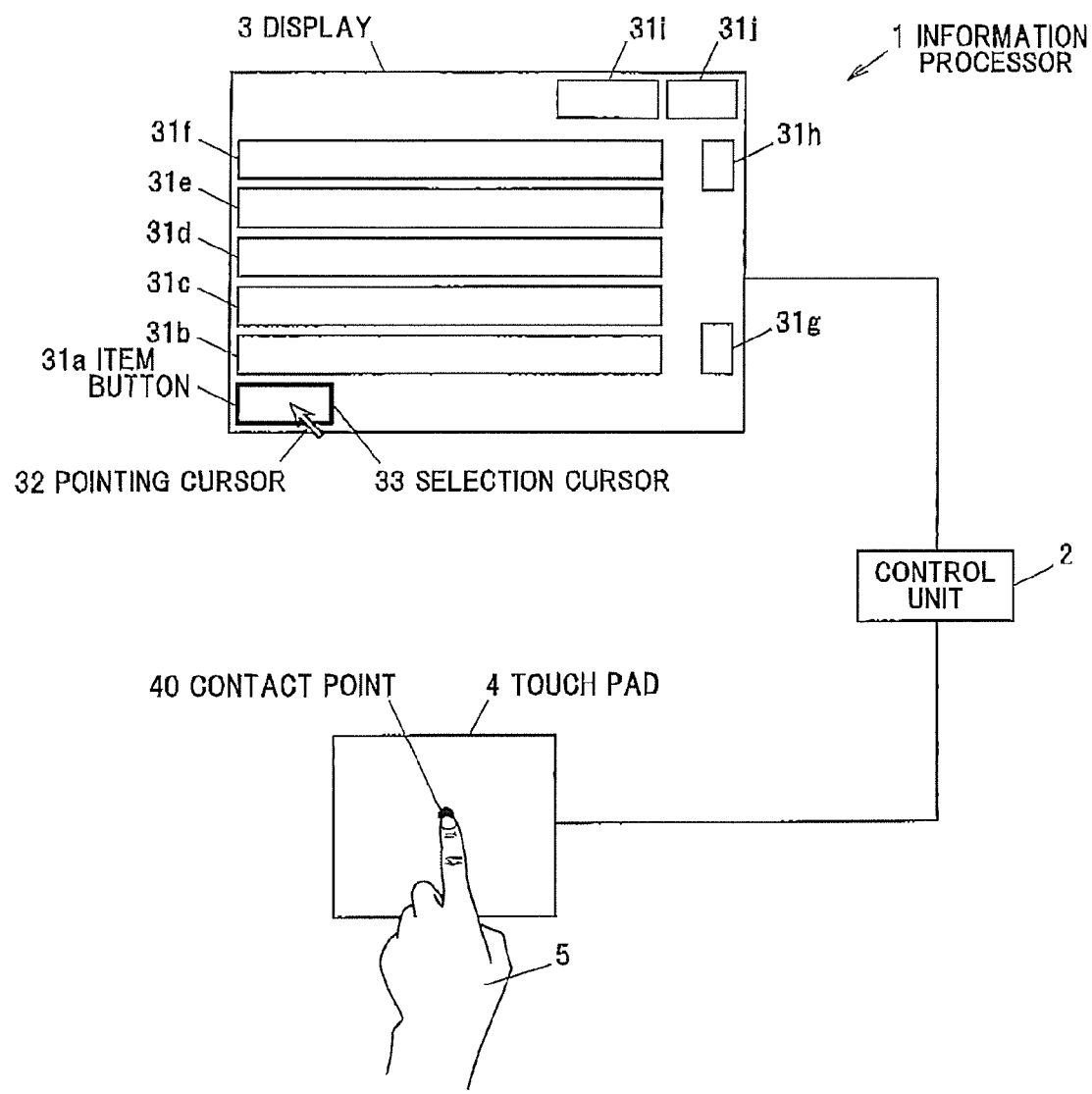
FIG. 1 is a schematic view showing a configuration example of an information processor in an embodiment.

FIG. 1 is a schematic view showing a configuration example of an information processor in the embodiment.

In FIG. 1, a typical information processor in the first embodiment is generally indicated by the reference numeral 1 and is schematically illustrated. The information processor 1 is used for, but is not specifically limited to, controlling an operation of, e.g., in-vehicle devices such as air conditioner, audio device and navigation system.

The information processor 1 has a control unit 2 connected to non-illustrated in-vehicle devices such as mentioned above to control operations thereof, a display 3 as a display means for displaying control screens, etc., of the in-vehicle devices and a touch pad 4 as an input means for outputting an input signal. The control unit 2 is operated based on the input signal from the touch pad 4 and controls images on the display 3.

The information processor 1 in the illustrated example is arranged so that, e.g., the display 3 is located on a dash panel and the touch pad 4 is located around a driver's seat such as on a center console. The information processor 1 is configured so that, when the touch pad 4 is touch-operated by a finger 5 of a user, a position of, e.g., a contact point 40 on a surface of the touch pad 4 is detected by a touch sensor, a position detection signal corresponding to the detected position is output to select and commit one of item buttons 31a to 31j (also representatively referred to as "item buttons 31")

on the display 3 and the control unit 2 controls an in-vehicle device according the selection and commission.

The display 3 shows a control screen of an in-vehicle device including the item buttons 31a to 31j. Although the item buttons 31a to 31j can have the same size and can be arranged in a regular manner, the irregularly-arranged item buttons 31a to 31j with various sizes as shown in the drawings will be described here.

The control screen of an in-vehicle device displayed on the display 3 is, e.g., a control screen of an audio device in which the item button 31a is a switching button for switching to a control screen of another in-vehicle device, the item buttons 31b to 31f are track number selection buttons for an album being played, the item buttons 31g and 31h are scroll buttons for vertically scrolling the track number list, the item button 31i is an album selection button and the item button 31j is an artist selection button. The display 3 may alternatively display a control screen of an air conditioner or a navigation system, or may display control screens of plural in-vehicle devices on the same screen.

Based on an input signal output from the touch pad 4, an pointing cursor 32 displayed on the display 3 moves in a display area by a distance proportional to the move distance of the contact point 40 on the touch pad 4. In other words, the coordinates indicated by the pointing cursor 32 are relative to the coordinates of the contact point 40 on the touch pad 4. The pointing cursor 32 may be a virtual cursor which is not displayed.

Meanwhile, a selection cursor 33 displayed on the display 3 is to select one of the item buttons 31a to 31j based on a below-described positional relation between the item buttons 31a to 31j and the pointing cursor 32.

Although an operation surface of the touch pad 4 shown in the drawing has a rectangular shape, an arbitrary shape composed of curved lines and straight lines can be selected or an operation surface may be divided into plural sections.

Operation in the Embodiment

An operation of the information processor 1 will be described below in reference to FIGS. 1 to 4.

Figure 4:
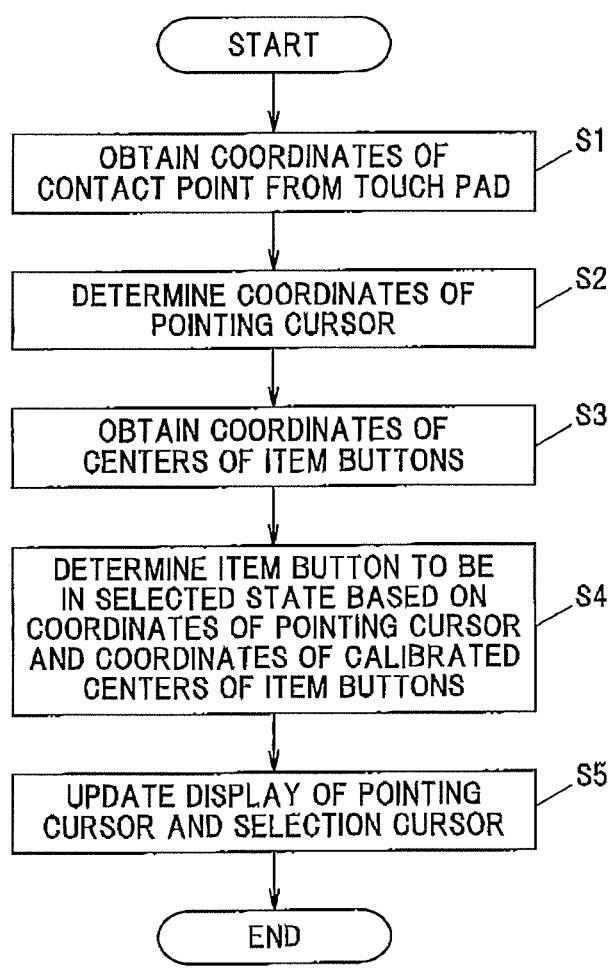
FIG. 4 is a flowchart showing an example of an operation of the information processor.

FIG. 4 is a flowchart showing an example of an operation of the information processor 1.

The operation described below is to be executed at a predetermined cycle. The cycle can be appropriately changed depending on a refresh rate of the touch pad 4, a refresh rate of the display 3 and the technical specification of the control unit 2 and is, e.g., 60 Hz to 200 Hz.

Firstly, the control unit 2 obtains the coordinates of the contact point 40 based on the input signal output from the touch pad 4 (S1).

Next, the control unit 2 calculates the move distance of the contact point 40 on the touch pad 4 from a difference between the obtained coordinates and the coordinates of one cycle before, then obtains a position of the pointing cursor 32 in the display area after moving from the coordinates of one cycle before by a distance proportional to the move distance and determines the coordinates thereof as the coordinates of the pointing cursor (S2).

Next, the control unit 2 obtains the coordinates of the centers of the item buttons 31a to 31j (S3). Information about the coordinates of the centers of the item buttons 31a to 31j is pre-stored in a memory which is not illustrated.

Next, the control unit 2 determines an item button to be in a selected state by the following method (S4).

Figure 2:
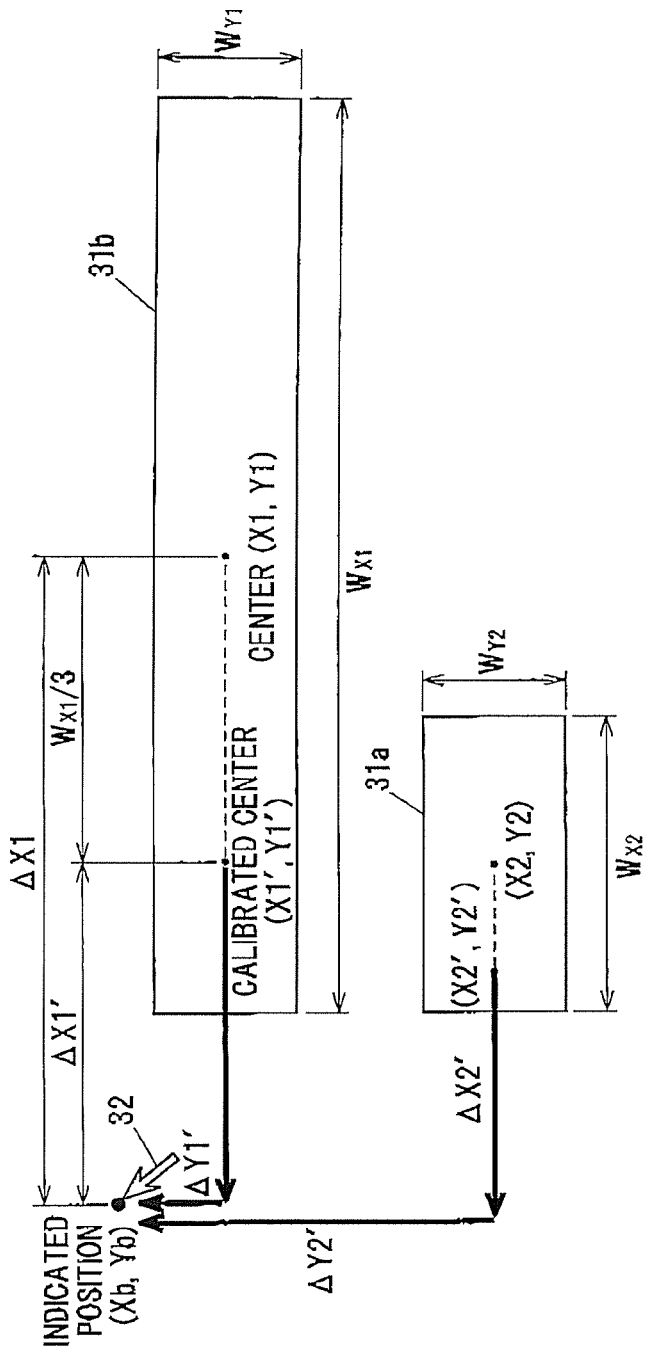
FIG. 2 is an explanatory diagram illustrating an operation for selecting one of item buttons based on a positional relation between a pointing cursor and the item buttons.

FIG. 2 is an explanatory diagram illustrating an operation for selecting one of the item buttons 31 based on a positional relation between the pointing cursor 32 and the item buttons 31. How to determine which one of the item buttons 31a and 31b is to be in the selected state will be explained below for simplification. In the coordinate system described below, an upper 10 corner of the display area is an origin (0, 0), the rightward direction is the X direction and the downward direction is the Y direction.

When the item button 31a having a width $W_{X2}$ and a height $W_{Y2}$ has the center at the coordinates (X2, Y2) and the item button 31b having a width $W_{X1}$ and a height $W_{Y1}$ has the center at the coordinates (X1, Y1), the control unit 2 firstly shifts the coordinates of the center by a distance obtained by multiplying a width by a constant α (a predetermined percent of the width) and calculates a calibrated center. Although the constant α is ⅓ in the example shown in FIG. 2, another value may be used based on, e.g., arrangement or sizes of the item buttons 31 or a shape of the display area.

Here, $X2'=X2-\frac{1}{3}W_{X2}$ and $Y2'=Y2-\frac{1}{3}W_{Y2}$ where the coordinates of the calibrated center of the item button 31a are (X2', Y2'). Meanwhile, $X1'=X1-\frac{1}{3}W_{X1}$ and $Y1'=Y1-\frac{1}{3}W_{Y1}$ where the coordinates of the calibrated center of the item button 31b are (X1', Y1'). FIG. 2 shows an example in which the center is calibrated only in the X direction.

Next, the control unit 2 calculates a distance between the coordinates (Xb, Yb) of the pointing cursor 32 and the calibrated centers of the item buttons 31a and 31b by the following method.

Firstly, a distance L2 between the pointing cursor 32 and the item button 31a is: $L2=\Delta X2'+\Delta Y2'=|X2-Xb|-\frac{1}{3}W_{X2}+|Y2-Yb|-\frac{1}{3}W_{Y2}$. $|X2-Xb|-\frac{1}{3}W_{X2}$ is regarded as 0 when $|X2-Xb|-\frac{1}{3}W_{X2}<0$, and $|Y2-Yb|-\frac{1}{3}W_{Y2}$ is regarded as 0 when $|Y2-Yb|-\frac{1}{3}W_{Y2}<0$.

Meanwhile, a distance L1 between the pointing cursor 32 and the item button 31b is: $L1=\Delta X1'+\Delta Y1'=|X1-Xb|-\frac{1}{3}W_{X1}+|Y1-Yb|-\frac{1}{3}W_{Y1}$. $|X1-Xb|-\frac{1}{3}W_{X1}$ is regarded as 0 when $|X1-Xb|-\frac{1}{3}W_{X1}<0$, and $|Y1-Yb|-\frac{1}{3}W_{Y1}$ is regarded as 0 when $|Y1-Yb|-\frac{1}{3}W_{Y1}<0$.

Then, based on comparison between L2 and L1, the control unit 2 determines the item button 31a to be in the selected state when L2<L1 or determines the item button 31b to be in the selected state when L1<L2.

FIGS. 3A to 3C are schematic views showing the item button 31 selected based on the positional relation between the pointing cursor 32 and the item buttons 31.

In FIG. 3A, the constant α for calculating the calibrated center is ⅓. The item button 31a is determined to be in the selected state when the pointing cursor 32 is located in an area $A_a$. In the same manner, the item button 31b, the item button 31c or another is determined to be in the selected state when the pointing cursor 32 is located in an area $A_b$, an area $A_c$ or another.

In other words, when the pointing cursor 32 moves on a path $R_c$ as shown in FIG. 3A, the item button 31 located at the coordinates of the pointing cursor 32 successfully matches with the item button 31 to be in the selected state.

Meanwhile, in FIG. 3B, the centers are not calibrated and the nearest item button 31 is determined to be in the selected state based on a distance between the centers of the item buttons 31 and the coordinates of an indicated position. In this case, when the pointing cursor 32 moves on the path $R_c$, the item button to be in the selected state is determined to be 31a even if the coordinates of the pointing cursor 32 are located on, e.g., the item button 31b or 31c, hence, no match.

FIG. 3C is shown for reference, in which the constant α for calculating the calibrated center is ⅕. When the pointing cursor 32 moves on the path $R_c$, the item button to be in the selected state is determined to be 31a when the coordinates of the pointing cursor 32 are located on, e.g., the item button 31b, hence, no match. However, the item button to be in the selected state is determined to be 31a, 31c or 31d when the coordinates of the pointing cursor 32 are located on the item button 31a, 31c or 31d, which means that the selected item button matches better than the case where the centers are not calibrated.

Next, the control unit 2 updates the display of the pointing cursor 32 and the selection cursor 33 based on the coordinates of the pointing cursor 32 determined by the operation described above and the item button 31 on which the selection cursor 33 should be displayed (S5).

Effects of the Embodiment

In the embodiment, the coordinates of the centers are calibrated using the width and the height of the item buttons 31 and the item button 31 to be in the selected state is determined based on the distance between the pointing cursor 32 and the calibrated centers. Therefore, it is possible to determine the item button 31 to be in the selected state in consideration of the sizes and shapes of the item buttons 31 as well as the positions thereof. Thus, the selection of an icon undesired by the user due to the sizes, shapes and positional relation of plural icons displayed on the display screen can be prevented or reduced as compared to the conventional information processor.

In addition, adjusting the constant $\alpha$ for calculating the calibrated center allows various shapes and arrangements of the item buttons 31 to be accepted. The calculation of the calibrated center based on the coordinates of the center of the item button 31 and a value obtained by multiplying the width of the item button 31 by the constant $\alpha$ is subtraction but may be addition.

Modifications

Although the typical configuration example of the information processor 1 of the invention has been described above with the embodiment and illustrated example, the following modifications can be also implemented.

(1) The information processor 1 can be used not only for in-vehicle devices but also for various electronic/electrical devices.

(2) The invention is applicable to various information processors not provided with a touch pad, such as mouse devices and operation knobs.

(3) The number, positions and arrangement configuration of the information processors 1 may be appropriately selected according to, e.g., the intended use, etc.

It should be noted that the invention is not intended to be limited to the embodiment and the various kinds of modifications can be implemented without departing from or adjusting the technical idea of the invention.

What is claimed is:

1. An information processor, comprising:
a means for displaying a plurality of item buttons in a display region, the item buttons each having center coordinates and outlines;
a means for determining coordinates of an indicated position in the display area based on an input signal;
means for calibrating the center coordinates of each of the plurality of item buttons to coordinates between the center coordinates and the outlines of each of the item buttons to obtain the calibrated center coordinates based on the outlines; and
a means for determining, each and every time an item button is selected, which of the item buttons is in a selected state by determining which of the calibrated center coordinates of the item buttons is closest to the coordinates of the indicated position,
wherein the calibrating means operates such that the center coordinates are displaced in a direction toward one of the outlines by a predetermined percentage of a width of each of the item buttons to obtain the calibrated center coordinates.

2. The information processor according to claim 1, wherein the displaying means comprises a display for displaying a control screen of an in-vehicle device, and wherein the input signal is outputted from a touch pad electrically connected to the display.

3. The information processor according to claim 2, wherein the coordinates of the indicated position comprises coordinates to be indicated by a cursor displayed on the display, and wherein the cursor moves in the display region based on the input signal.

4. The information processor according to claim 1, wherein the coordinates of the indicated position and the center coordinates are defined by an origin disposed in the display region, and wherein the calibrating means calculates the calibrated center coordinates by subtracting or adding an X coordinate value and/or Y coordinate value corresponding the predetermined rate of the width from/to the center coordinates.

5. The information processor according to claim 1, wherein the calibrating means operates such that the center coordinates are displaced in the direction toward one of the outlines to be close to the indicated position and located within the outlines of each of the item buttons after being displaced.

* * * * *